United States Patent [19]

Bergsten et al.

[11] Patent Number: 4,909,706
[45] Date of Patent: Mar. 20, 1990

[54] CONTROLLED CLEARANCE LABYRINTH SEAL

[75] Inventors: Victor E. Bergsten, East Amherst; Edward P. Eardley, North Tonawanda, both of N.Y.

[73] Assignee: Union Carbide Corporation, Danbury, Conn.

[21] Appl. No.: 7,479

[22] Filed: Jan. 28, 1987

[51] Int. Cl.$^4$ .................. F01D 11/02; F04D 29/08; F16J 15/447
[52] U.S. Cl. .................. 415/172.1; 277/1; 277/5; 277/22; 277/26; 277/53; 285/187; 285/321; 285/340; 415/173.6; 415/174.5
[58] Field of Search .............. 277/53, 174, 176, 181, 277/182, 183, 54; 415/110, 111, 112, 170 R, 170 A, 172 R, 172 A, 174, 174.5, 173.5; 285/321, 905, 340, 187; 411/534, 521

[56] References Cited

U.S. PATENT DOCUMENTS

| 924,897 | 6/1909 | Emmet | 277/54 |
|---|---|---|---|
| 2,149,243 | 3/1939 | Huhn . | |
| 2,600,991 | 6/1952 | Hargrove . | |
| 2,851,289 | 9/1958 | Pedersen | 415/174 X |
| 3,018,085 | 1/1962 | Welsh | 415/174 X |
| 3,019,035 | 1/1962 | Klompas | 277/54 |
| 3,019,736 | 2/1962 | Stalker | 415/174.5 |
| 3,129,922 | 4/1964 | Rosenthal | 415/170 R |
| 3,174,719 | 3/1965 | Sproult | 415/170 A X |
| 3,275,330 | 9/1966 | Rein et al. | 415/170 A X |
| 3,411,794 | 11/1968 | Allen | 277/53 |
| 3,460,843 | 8/1969 | Jaeger | 415/170 A X |
| 3,512,788 | 5/1970 | Kilbane | 415/117 X |
| 3,516,757 | 6/1970 | Banmann | 415/170 R X |
| 3,537,713 | 11/1970 | Matthews et al. | 415/174 X |
| 3,632,118 | 1/1972 | Herger | 277/4 |
| 3,823,950 | 7/1974 | Pedersen | 277/53 X |
| 3,826,589 | 7/1974 | Frank et al. | 415/170 A |
| 3,876,330 | 4/1975 | Pearson et al. | 415/174 X |
| 4,049,361 | 9/1977 | Chacour | 415/170 A |
| 4,060,250 | 11/1977 | Davis et al. | 415/172 R X |
| 4,105,226 | 8/1978 | Frey et al. | 285/321 X |
| 4,139,160 | 2/1979 | Rood | 285/321 X |
| 4,190,396 | 2/1980 | Tomioka et al. | 415/170 R X |
| 4,264,271 | 4/1981 | Libertini | 415/174 X |
| 4,330,133 | 5/1982 | Palfreyman et al. | 277/26 |
| 4,402,515 | 9/1983 | Malott | 415/174 X |
| 4,472,107 | 7/1984 | Chang et al. | 415/170 R X |
| 4,513,975 | 4/1985 | Hauser et al. | 277/22 |

FOREIGN PATENT DOCUMENTS

| 265104 | 2/1927 | United Kingdom | 277/54 |
|---|---|---|---|
| 1020900 | 2/1966 | United Kingdom | 415/174 |

Primary Examiner—Allan N. Shoap
Attorney, Agent, or Firm—Stanley Ktorides

[57] ABSTRACT

A labyrinth seal for sealing the gap between the rotating impeller assembly and the stationary housing of turbomachinery comprising a seal holder which serves simultaneously to comprise the stationary part of the seal and to contact process gas so as to maintain the stationary seal part temperature at about the temperature of the rotating part, thus reducing differential thermal change between the stationary and rotating members of the labyrinth seal.

13 Claims, 1 Drawing Sheet

CONTROLLED CLEARANCE LABYRINTH SEAL

TECHNICAL FIELD

This invention relates to labyrinth seals such as are used to form a seal between rotating and stationary parts of turbomachinery.

BACKGROUND OF THE INVENTION

Turbomachinery, such as turbocompressors and turboexpanders, are used to process gas from a first pressure to a second pressure and in the process the gas experiences a significant change in temperature. For example, in a turboexpander such as is often used in a cryogenic air separation plant, gas at a high pressure is passed through the turboexpander and expanded to a low pressure, thus experiencing a reduction in temperature and generating refrigeration for the cryogenic process. Examples of turbomachinery may be found in U.S. Pat. No. 4,430,011 - Kun and U.S. Pat. No. 4,472,107 - Chang et al.

Turbomachinery is characterized by a stationary outer housing and a rotatable shaft axially aligned within the housing. Mounted on the shaft are impeller blades through which the gas passes while experiencing the pressure change. The blades are often covered by a shroud for protection and improved performance. The assembly, i.e., shaft, blades and shroud, rotate at a very high speed, typically in excess of 5000 rpm when the turbomachinery is in operation. In order to avoid damage to turbomachinery parts, the rotating assembly within the housing is spaced from the stationary housing.

The space between the rotating assembly and the stationary housing is a source of inefficiency because it provides a pathway for gas to bypass the turbomachine. In order to reduce the amount of gas passing through this spacing, practitioners in this art typically place a seal within the spacing. Generally the seal is a labyrinth seal.

A labyrinth seal comprises a series of knife-like or tooth-like edges on the rotating part which are adjacent softer seal material on the stationary housing. The edges extend through the spacing between the rotating and stationary elements to nearly contact the stationary element. Thus there is created a series of extremely small annular spaces between the rotating and stationary parts making it very difficult for gas to pass through each of the serial small spaces in order to bypass the turbomachinery.

A common problem with labyrinth seals used in turbomachinery is the tendency of the spacing between the rotating edges and the seal material to change during operation of the turbomachinery due to temperature effects. Due to the significant temperature change of gas as it passes through the turbomachinery, there is a significant temperature difference between the rotating assembly, which experiences a temperature change in the direction of the gas temperature, and the stationary housing which is at the initial temperature. Thus the edges which are on the rotating assembly are at a different temperature than the seal material which is on the stationary housing. This temperature difference causes the two parts of the labyrinth seal to expand or contract at different rates and this differential thermal movement in the seal parts causes the space between them to change. The larger is the space between the seal parts the greater is the amount of gas which can bypass the turbomachinery and the greater is the efficiency loss experienced. However, spacing which is too close may result in unreliable operation if the parts come into contact.

It is therefore an object of this invention to provide a labyrinth seal for turbomachinery which experiences a reduced differential thermal movement between rotating and stationary seal parts.

SUMMARY OF THE INVENTION

The above and other objects which will become apparent to one skilled in the art upon a reading of this disclosure are attained by the present invention which is:

A labyrinth seal for turbomachinery having an impeller shroud rotatably mounted within and spaced from a startionary housing said labyrinth seal comprising: an annular seal holder of heat conductive material attached to the housing but spaced from the housing along its axial length and capable of radial movement with respect to said housing, said seal holder having seal material along at least a portion of its inner axial length, said seal material being adjacent and spaced from a toothed portion of the impeller shroud, said seal holder extending past the edge of the impeller shroud.

DETAILED DESCRIPTION

The labyrinth seal of this invention will be described in detail with reference to the drawings.

Figure 1:
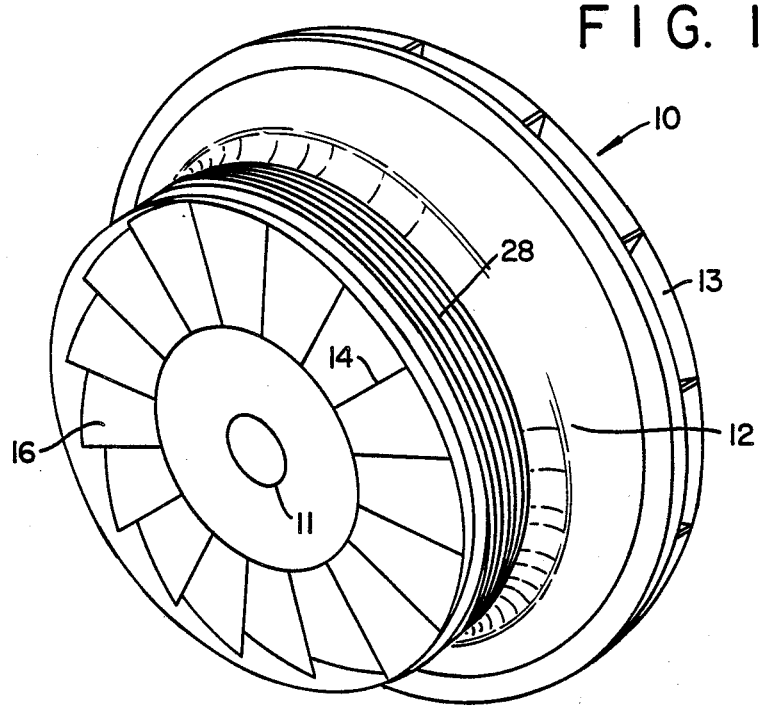
FIG. 1 is an isometric view of a turbomachinery impeller showing one embodiment of the rotating element of the labyrinth seal of this invention.

Referring now to FIG. 1, turbomachinery impeller 10 comprises shaft 11 upon which are mounted turbine blades 16 enclosed by impeller shroud 12. During operation the impeller rotates about its axial centerline and the gas that is being expanded or compressed will flow through the flow channels formed by the blades and the enclosing shroud. For example, for an expansion turbine, the gas would enter the blades at the outermost radius 13, pass through the flow channels as it expands transferring power to the rotating impeller, and exit at the discharge annulus 14. In the case of a turbocompressor, the flow of fluid would be reversed.

Along at least a portion of the axial length of the shroud and completely around the outside of the shroud is a series of knifelike or toothlike edges 28 which form the rotating element of the labyrinth seal of this invention. In operation, impeller 10 is mounted within and is spaced from a stationary housing which conforms to the shape of the impeller. Toothed portion 28 forms a seal with the stationary elements of the labyrinth seal of this invention in order to restrict the flow of gas between the shroud and the housing thus reducing the amount of gas which can bypass the turbine blades.

Figure 2:
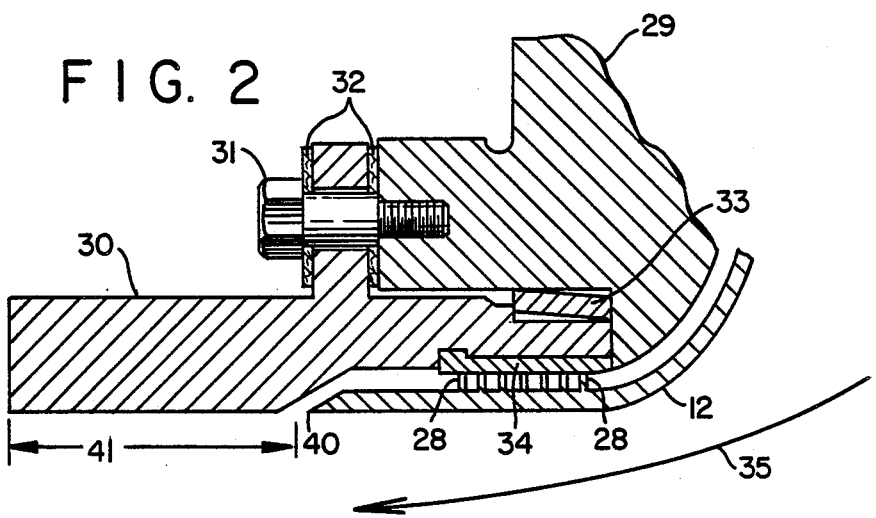
FIG. 2 is a cross-sectional view of a preferred embodiment of the labyrinth seal of this invention.

Referring now to FIG. 2, shroud 12 and stationary housing 29 are spaced apart. In conventional labyrinth seals the toothed portion of the impeller shroud forms a labyrinth seal with seal material on the adjacent portion of the housing. In the labyrinth seal of this invention the seal material is not on the housing but on seal holder 30 which is attached to but otherwise independent from the housing. Seal holder 30 is between shroud 12 and housing 29 in the area of toothed portion 28.

Seal holder 30 is an annular ring which fits around the toothed portion of shroud 12 and extends out past the edge 40 of the shroud 12. Seal holder 30 is attached to housing 29 such as by means of shoulder screws 31 so that it is restrained in the axial direction, but is separate from housing 29 and spaced from housing 29 along at least portion of its axial length. Furthermore the flanged section of seal holder 30 is separated from housing 29 and the heads of shoulder screws 31 by low friction and low thermal conductivity annular slide rings 32.

Along at least a portion of the inner axial length of seal holder 30, adjacent and spaced from toothed portion 28, is seal material 34. Seal material 34 is relatively soft material which serves to reduce damage to toothed portion 28 should there be momentary contact between the rotary and stationary parts of the turbomachinery. Preferably the seal material is lead-based babbitt which is a mixture of 10–15 percent antimony, 2–10 percent tin, up to 0.2 percent copper, with or without arsenic, with the remainder lead. Other materials which may be used for seal material 34 include lead, silver, gold, soft plastics, Micarta ™ and magnesium. The preferred material depends upon its friction characteristics relative to the impeller material and ease of bonding to the seal holder 30.

The operation of the labyrinth seal of this invention will be described with reference to the operation of a turboexpander. In a turboexpander gas passes through the impeller in the direction indicated by arrow 35 in FIG. 2 and in the process the gas expands and cools. Thus the impeller including the toothed portion is cooled by the expanding gas and consequently experiences inward thermal contraction. The housing however remains essentially at the inlet gas temperature and thus undergoes less thermal contraction than the impeller. Thus the gap between the impeller assembly and the housing widens. In conventional labyrinth seal arrangements wherein the seal material is on the housing this differential thermal contraction causes the seal gap to widen and allows a greater quantity of process gas to bypass the turbine blades.

In the labyrinth seal of this invention seal holder 30 serves to keep seal material 34 and toothed portion 28 at about the same temperature thus reducing their thermal contraction differential and keeping the gap between them narrower than would otherwise be the case with a conventional labyrinth seal. Seal holder 30 accomplishes this by extending past edge 40 of shroud 12 so that it comes in thermal contact with cold gas past the impeller exit. Thus the cold gas serves to cool seal holder 30 and causes it to thermally contract in order to maintain a small gap between it and contracting toothed portion 28. Seal holder 30 is made of heat conductive material and thus heat is rapidly passed from one end of seal holder 30 where seal material 34 is located to the other end. Preferably seal holder 30 is made of aluminum. Other suitable heat conductive materials from which seal holder 30 could be made include brass, bronze, copper, tin and gold. However the material for seal holder 30 must be compatible with seal material 34 or an intermediate bonding material to maintain adherence and chemical stability. For example, in the case where the seal holder is made of aluminum, an intermediate layer of copper is preferably electrodeposited to provide a compatible surface for the babbitt.

Extension 41 which is the part of seal holder 30 which extends past edge 40 of shroud 12 should be of sufficient length to provide a large surface area to enable efficient heat transfer from process gas to seal holder 30. Generally the length of extension 41 will be from 25 to 75 percent of that of seal holder 30 and preferably is from 50 to 75 percent. In addition seal holder 30 should have a sufficient thickness, i.e., difference between inside and outside diameter, to enable efficient heat transfer axially along the seal holder length.

Seal holder 30 is capable of radial movement with respect to housing 29. Thus as seal holder 30 contracts inward, the gap between seal holder 30 and housing 29 along their common axial length widens. In order to ensure that seal holder 30 remains concentric with housing 29, conical take-up ring 33 is preferably provided between seal holder 30 and housing 29. Take-up ring 33 acts as a relatively weak spring in the radial direction and as a relatively stiff spring in the transverse direction. As seal holder 30 contracts, the angle of take-up ring 33 increases thus maintaining the concentricity of seal holder 30 along its entire circumference with respect to housing 29 despite their different rates of thermal change. Specifically, any change in the radial space between seal holder 30 and housing 29 causes a change in a uniform circumferentially distributed toroidal moment on the take-up ring cross-section. Since a thin-section ring (cross-sectional area divided by radius squared less than 0.01) will easily roll under such a moment change, there will be very little resistance to the change in the radial space between seal holder 30 and housing 29. Conversely, any tendency for seal holder 30 to shift in the transverse direction relative to housing 29 loads the entire ring in shear. Since the ring 33 is essentially a very short, stiff beam when loaded in shear, the seal holder 30 remains concentric to housing 29.

The following examples are provided for illustrative purposes and are not intended to be limiting.

EXAMPLE I

A turboexpander was provided with a labyrinth seal of this invention similar to that shown in FIG. 2. The seal holder was made of brass and had a thickness of one inch between its inner and outer diameters at the extension portion. The overall axial length of the seal holder was 3 inches and the length of the extension past the shroud edge was 1½ inches. The seal material was lead-based babbitt and the impeller shroud including the toothed portion was aluminum. The impeller operated at 22,500 revolutions per minute (rpm). Gas at a temperature of 300° R. and a pressure of 639 psia entered and passed through the turboexpander, and exited the turboexpander at a temperature of 167° R. and a pressure of 70 psia. The gap between the toothed portion and the seal material was reduced by about 0.0006 inches over the gap that would occur with a conventional labyrinth seal. This reduction in the seal gap provides an increase in the efficiency of the turboexpander of 0.25 percent.

EXAMPLE II

A turboexpander is provided with a labyrinth seal of this invention similar to that shown in FIG. 2. The seal holder is made of aluminum and has a thickness of one inch between its inner and outer diameters at the extension portion. The overall axial length of the seal holder is 3 inches and length of the extension past the shroud edge is 1½ inches. The seal material is lead-based babbitt and the impeller shroud including the toothed portion is aluminum. The impeller is operated and gas is passed through the turboexpander as described in Example I. The gap between the toothed portion and the seal material is reduced by about 0.0021 inches over the gap that would occur with a conventional labyrinth seal. This reduction in the seal gap provides an increase in the efficiency of the turboexpander of 0.7 percent.

Now by the use of the labyrinth seal of this invention one can operate turbomachinery with increased efficiency. Although the labyrinth seal of this invention has been described in detail with reference to a specific embodiment and in operation in a turboexpander, those skilled in the art will recognize that there are other embodiments of the labyrinth seal of this invention and that the invention is useful with any type of turbomachinery.

We claim:

1. Turbomachinery with a labyrinth seal comprising:
   (A) a rotatable assembly comprising (i) a shaft, (ii) a plurality of blades mounted on the shaft, said blades having a greater diameter at one axial end and a lesser diameter at the other axial end, and (iii) an impeller shroud attached to and encasing the blades from their lesser to their greater diameter so as to form a fluid flow passage, said shroud having an edge at the axial end of lesser blade diameter and having a toothed portion;
   (B) a stationary housing spaced from the impeller shroud; and
   (C) an annular seal holder attached to the housing, situated between the housing and the impeller shroud adjacent the toothed portion, said holder positioning a seal member in a labyrinth sealing relationship with said toothed portion, and said holder having a tubular extension extending beyond said edge of the impeller shroud by at least 25 percent of the axial length of the seal holder, said extension extending axially beyond and spaced from that part of the housing to which said seal holder is attached;
   whereby fluid expanded or compressed by the turbomachinery contacts the seal holder extension adjacent the region of lesser blade diameter.

2. The seal of claim 1 wherein the seal holder is attached to the housing at a flanged portion which is perpendicular to the axial length of the seal holder.

3. The seal of claim 1 wherein the part of the seal holder which extends past the edge of the impeller shroud is from 25 to 75 percent of the total axial length of the seal holder.

4. The seal of claim 1 wherein the part of the seal holder which extends past the edge of the impeller shroud is from 50 to 75 percent of the total axial length of the seal holder.

5. The seal of claim 1 wherein the turbomachinery is a turboexpander.

6. A method for controlling the clearance between rotating and stationary members of a turbomachinery labyrinth seal comprising:
   (A) passing fluid through a passage formed by blades mounted on a rotatable shaft, said blades having a greater diameter at one axial end and a lesser diameter at the other axial end, and an impeller shroud attached to and encompassing the blades from their lesser to their greater diameter, said impeller shroud having a toothed portion and being spaced from a stationary housing, said fluid experiencing a pressure change and consequently a temperature change due to said passing;
   (B) passing the fluid, outside of the passage and adjacent the region of lesser blade diameter, in contact with an extension of a tubular annular seal holder, said seal holder attached to the housing and situated between the housing and the impeller shroud adjacent the toothed portion and accomplishing this by providing said extension extending beyond said impeller shroud by at least 25 percent of the axial length of the seal holder, and extending axially beyond said spaced from that part of the housing to which said seal holder is attached; and
   (C) transferring heat between the fluid and the seal holder extension so as to cause the seal holder to expand or contract in response to said heat transfer said holder positioning a seal member in a labyrinth sealing relationship with said toothed portion;

7. The method of claim 6 wherein the fluid is passed through the passage from the greater to the lesser diameter and experiences a pressure decrease during the passage.

8. The method of claim 6 wherein the fluid is passed through the passage from the lesser to the greater diameter and experiences a pressure increase during the passage.

9. Turbomachinery with a labyrinth seal comprising:
   (A) a rotatable assembly comprising (i) a shaft, (ii) a plurality of blades mounted on the shaft, said blades having a greater diameter at one axial end and a lesser diameter at the other axial end, and (iii) an impeller shroud attached to and encasing the blades from their lesser to their greater diameter so as to form a fluid flow passage, said shroud having an edge at the axial end of lesser blade diameter and having a tooth portion;
   (B) a stationary housing spaced from the impeller shroud;
   (C) an annular seal holder attached to the housing, situated between the housing and the impeller shroud adjacent the toothed portion, said holder positioning a seal member in a labyrinth sealing relationship with said toothed portion, and having a tubular extension extending beyond said edge of the impeller shroud; and
   (D) a conical take-up ring between the seal holder and the housing, said take-up ring contacting the housing on the radial outer side of the take-up ring at the greater diameter of the take-up ring, and contacting the seal holder on the radial inner side of the take-up ring at the lesser diameter of the take-up ring;
   whereby fluid expanded or compressed by the turbomachinery contacts the seal holder extension adjacent the region of lesser blade diameter.

10. The turbomachinery of claim 9 wherein the seal holder is attached to the housing at a flanged portion which is perpendicular to the axial length of the seal holder.

11. The turbomachinery of claim 9 wherein the part of the seal holder which extends past the edge of the impeller shroud is from 25 to 75 percent of the total axial length of the seal holder.

12. The turbomachinery of claim 9 wherein the part of the seal holder which extends past the edge of the impeller shroud is from 50 to 75 percent of the total axial length of the seal holder.

13. The turbomachinery of claim 9 wherein the turbomachinery is a turboexpander.

* * * * *